United States Patent
Park et al.

(10) Patent No.: US 9,007,548 B2
(45) Date of Patent: Apr. 14, 2015

(54) WIDE VIEW ANGLE LIQUID CRYSTAL DISPLAY DEVICE OPERATING IN NORMALLY WHITE MODE

(75) Inventors: Sehong Park, Goyang-si (KR); Eungdo Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 287 days.

(21) Appl. No.: 12/901,052

(22) Filed: Oct. 8, 2010

(65) Prior Publication Data

US 2011/0085114 A1    Apr. 14, 2011

(30) Foreign Application Priority Data

Oct. 12, 2009  (KR) .......................... 10-2009-0096944
Oct. 1, 2010   (KR) .......................... 10-2010-0095736

(51) Int. Cl.
  *G02F 1/1335*    (2006.01)
  *G02F 1/1343*    (2006.01)
  *C09K 19/02*     (2006.01)

(52) U.S. Cl.
  CPC ............... *G02F 1/134363* (2013.01); *G02F 2001/133531* (2013.01); *G02F 2203/66* (2013.01)

(58) Field of Classification Search
  USPC ............ 349/96–103, 123–126, 141, 143, 186
  See application file for complete search history.

(56) References Cited

U.S. PATENT DOCUMENTS

| | | | | |
|---|---|---|---|---|
| 5,058,998 | A * | 10/1991 | Yoshida et al. | 349/101 |
| 6,822,711 | B1 * | 11/2004 | Yoshida et al. | 349/95 |
| 6,876,419 | B2 * | 4/2005 | Kim et al. | 349/129 |
| 6,903,784 | B1 * | 6/2005 | Basturk | 349/2 |
| 7,495,719 | B2 * | 2/2009 | Adachi et al. | 349/96 |
| 7,502,084 | B2 * | 3/2009 | Nishimura | 349/141 |
| 7,528,913 | B2 * | 5/2009 | Kobayashi | 349/123 |
| 7,576,820 | B2 * | 8/2009 | Miyachi et al. | 349/118 |
| 7,936,422 | B2 * | 5/2011 | Adachi et al. | 349/96 |
| 8,049,855 | B2 * | 11/2011 | Tanaka | 349/141 |

* cited by examiner

*Primary Examiner* — Dung Nguyen
(74) *Attorney, Agent, or Firm* — McKenna Long & Aldridge LLP

(57) ABSTRACT

The present disclosure relates to a wide viewing angle liquid crystal display device working in normally white mode. An wide viewing angle IPS mode TFT-LCD operating in a normally white mode comprises a first polarizer having a first polarizing axis parallel to a first direction; a second polarizer having a second polarizing axis parallel to the first direction; and liquid crystal molecules disposed between the first polarizer and the second polarizer, and having an initial alignment direction parallel to the first direction. The wide view angle IPS mode TFT-LCD according to the present disclosure is a operating in normally white mode which represents full white gray-scale without yellowish phenomenon, and does not need any additional optical film for overcoming the yellowish phenomenon so that the manufacturing process is simply and cost is lower than the LCD according to the related art.

7 Claims, 13 Drawing Sheets

WIDE VIEW ANGLE LIQUID CRYSTAL DISPLAY DEVICE OPERATING IN NORMALLY WHITE MODE

This application claims the benefit of Korean Patent Application No. 10-2009-096944 filed on Oct. 12, 2009 and Korean Patent Application No. 10-2010-0095736 filed on Oct. 1, 2010, which are incorporated herein by reference for all purposes as if fully set forth herein.

BACKGROUND OF THE INVENTION

1. Field of the Invention

The present disclosure relates to a wide viewing angle liquid crystal display device (or "LCD") working in normally white mode. Especially, the present disclosure relates to an LCD operating in normally white mode in which a nematic phase liquid crystal layer is driven by In-Plane Switching method for having a wide view angle feature.

2. Discussion of the Related Art

The most used LCD shows the picture data by modulating the luminescence of the light incident from the backlight unit by controlling the electric field applied to the liquid crystal layer. Generally, the liquid crystal display panel comprises a plurality of liquid crystal cells disposed in matrix type and an upper polarizer and a lower polarizer which are disposed at upper side and lower side of the liquid crystal cells, respectively, and in manner that the light transparent axes of them are perpendicularly disposed each other. The liquid crystal cells have the liquid crystal materials having the dielectric anisotropy and optical anisotropy. The liquid crystal panel further comprises a pixel electrode and a common electrode to form an electric field for driving the liquid crystal material. The pixel electrode can be connected to a switching element such as a thin film transistor (or "TFT"). The LCD device driving the liquid crystal material using the TFT is called as TFT-LCD. For the liquid crystal material, the nematic phase liquid crystal material is mostly used. According to the method for driving the liquid crystal cells, there are a vertical driving type and a horizontal driving type.

The vertical driving type TFT-LCD is also called as TN (Twisted Nematic) mode TFT-LCD of which structure is as shown in FIG. 1. FIG. 1 is a perspective view illustrating the TN mode TFT-LCD operating in normally white mode according to the related art. FIGS. 2A and 2B briefly show the operating principle of the TN mode TFT-LCD according to the FIG. 1.

Referring to FIG. 1, the TN mode TFT-LCD 10 comprises an upper substrate 11 and lower substrate 31 which are disposed in facing each other, and liquid crystal cell of liquid crystal molecules 41 disposed between the substrates 11 and 31. On the lower substrate 31, a plurality of scan line 33 and a plurality of data line 35 are crossly disposed to define a plurality of pixel arrayed in matrix type. The TFT 37 is formed where the scan line 33 and the data line 35 is crossed. The TFT 37 is electrically connected to the pixel electrode 39 supplying a positive electric voltage to the liquid crystal molecules 41 of the liquid crystal cell.

On the upper substrate 11, black matrix 13 is disposed in the matix pattern at the position corresponding to the scan line 33 and the data line 35 of the lower substrate for defining the pixel. At the pixel, color filter 15 is formed in manner that the color filters 15 representing R(red) color, G(green) color and B(blue) color are sequentially arrayed. On the layer of the color filter 15, a common electrode 17 is formed for supplying a negative voltage to the liquid crystal molecules 41.

Furthermore, an upper polarizer 21 and a lower polarizer 23 are disposed on the upper outside of the upper substrate 11 and the lower outside of the lower substrate 31, respectively. The polarizers 21 and 23 make the incident light to be linearly polarized. Therefore, in order to get full black gray-scale perfectly, the upper polarizer 21 and the lower polarizer 23 should be disposed in manner that their polarizing axes are perpendicularly crossed each other. The liquid crystal molecules 41 are disposed in manner that liquid crystal molecules 41 are parallel but continuously twisted until the direction of the liquid crystal molecule near the upper substrate 11 and the direction of the liquid crystal molecule near the lower substrate 31 are crossed with 90 degrees.

Referring to FIGS. 2A and 2B, the operating conditions of the TN mode TFT-LCD 10 is explained. In FIGS. 2A and 2B, the detailed explain is focused on the upper polarizer 21, the lower polarizer 23 and the liquid crystal molecules 41 mainly. For the elements not shown in the FIGS. 2A and 2B, see FIG. 1.

The TN mode TFT-LCD 10 is operated in the normally white mode in which the white gray-scale is represented as the incident light through the lower polarizer 23 passes through the liquid crystal molecules 41 and the upper polarizer 21 when there is no electric field applied between the pixel electrode 39 and the common electrode 17. The incident light 43 from the light source (not shown) to the lower polarizer 23 is linearly polarized parallel to the polarizing axis of the lower polarizer 23 as incident light 43 passes through the lower polarizer 23. In FIG. 2A, the polarizing axis 3 of the lower polarizer 23 is set to 0° parallel to the x-axis of the rectangular coordinate system shown in the left corner, and the polarizing axis 1 of the upper polarizer 21 is set to 90° parallel to the y-axis. The phase of the light linearly polarized at 0° by passing through the lower polarizer 23 is delayed as passing through the twisted liquid crystal molecules 41 so that the axis of the linearly polarized light is changed to 90° parallel to the polarizing axis 1 of the upper polarizer 21. Therefore, because that the incident light 43 is linearly polarized by the lower polarizer 23, the polarization direction is changed by the twisted liquid crystal molecules 41 and then the light passes the upper polarizer 21, the LCD represents the full white gray-scale.

On the contrary, if a vertical electric field is formed between the pixel electrode 39 and the common electrode 17 as shown in FIG. 2B, the twisted structure of the liquid crystal molecules 41 will be broken by the dipole moment due to the vertical electric field. As a result, the liquid crystal molecules 41 are rearranged to the z-axis parallel with the direction of the applied electric field. In this case, the incident light 43 is also linearly polarized to 0° parallel to the x-axis by the lower polarizer 23, but this polarizing status is maintained as the light is passing through the liquid crystal molecules 41. Therefore, as the light passing through the liquid crystal molecules 41 has the polarizing axis perpendicular to the the polarizing axis 1 of the upper polarizer 21, it can not pass the upper polarizer 21. The LCD represents the full black gray-scale.

With these features, the TN mode TFT-LCD can be applied to the transparent display devices because it can be used as a transparent glass when there is no electric filed for driving the liquid crystal layer whilst it can be used as a display device when there is electric field for driving the liquid crystal layer. Furthermore, as the TN mode TFT-LCD can represents video information under the sun light with good quality, it can be applied to the reflective display device in which the backlight may not be needed, or to the semi-transparent display devices.

However, due to the initial condition of the liquid crystal molecules, TN mode TFT-LCD has the narrow view angle property.

For the wide angle LCD device using the nematic phase liquid crystal material, there is an IPS mode TFT-LCD as shown in FIG. 3. FIG. 3 is a perspective view illustrating the IPS mode TFT-LCD operating in normally black mode according to the related art. FIGS. 4A and 4B briefly show the operating principle of the IPS mode TFT-LCD according to the FIG. 3.

Referring to FIG. 3, the IPS mode TFT-LCD 50, as the TN mode TFT-LCD 10, comprises an upper substrate 51 and a lower substrate 71 which are disposed in facing each other, and liquid crystal cell of liquid crystal molecules 81 disposed between the substrates 51 and 71. On the lower substrate 71, a plurality of scan line 73 and a plurality of data line 75 are crossly disposed to define a plurality of pixel arrayed in matrix type. The TFT 77 is formed where the scan line 73 and the data line 75 is crossed. The TFT 77 is electrically connected to the pixel electrode 79 supplying a positive electric voltage to the liquid crystal molecules 81 of the liquid crystal cell. In order to form a horizontal electric field to the liquid crystal molecules 81, the IPS mode TFT-LCD 50 includes common electrode 57 formed on the lower substrate 71 with being parallel to the pixel electrode 79.

On the upper substrate 51, black matrix 53 is disposed in the matix pattern at the position corresponding to the scan line 73 and the data line 75 of the lower substrate for defining the pixel. At the pixel, color filter 55 is formed in manner that the color filters 55 representing R(red) color, G(green) color and B(blue) color are sequentially arrayed.

Furthermore, an upper polarizer 61 and a lower polarizer 63 are disposed on the upper outside of the upper substrate 51 and the lower outside of the lower substrate 71, respectively. In order to get full black gray-scale perfectly, the upper polarizer 61 and the lower polarizer 63 should be disposed in manner that their polarizing axes are perpendicularly crossed each other. The liquid crystal molecules 81 disposed between the upper substrate 51 and the lower substrate 71 are arrayed with having an initial alignment direction. For example, the liquid crystal molecules 81 have the initial alignment parallel to the polarizing axis of the upper polarizer 61. Even though it is not shown in figures, the initial alignment condition of the liquid crystal molecules 81 can be set by disposing alignment layers inside surfaces of the upper substrate 51 and the lower substrate 71 which are contacting the liquid crystal molecules 81, and by forming a rubbing pattern on the alignment layers along with the initial alignment direction.

Referring to FIGS. 4A and 4B, the operating conditions of the IPS mode TFT-LCD 50 is explained. In FIGS. 4A and 4B, the detailed explain is focused on the upper polarizer 61, the lower polarizer 63 and the liquid crystal molecules 81 mainly. For the elements not shown in the FIGS. 4A and 4B, see FIG. 3.

The IPS mode TFT-LCD 50 is operated in the normally black mode in which the black gray-scale is represented as the incident light through the lower polarizer 63 passes through the liquid crystal molecules 81 but it cannot pass through the upper polarizer 61 when there is no electric field applied between the pixel electrode 79 and the common electrode 57. The incident light 83 from the light source (not shown) to the lower polarizer 63 is linearly polarized parallel to the polarizing axis 3 of the lower polarizer 63 as incident light 83 passes through the lower polarizer 63. In FIG. 4A, the polarizing axis 3 of the lower polarizer 63 is set to 0° parallel to the X-axis of the rectangular coordinate system shown in the left corner, and the polarizing axis 1 of the upper polarizer 61 is set to 90° parallel to the Y-axis. As the light linearly polarized at 0° by passing through the lower polarizer 63 passes the liquid crystal molecules 81 arrayed parallel to the polarizing axis 1 of the upper polarizer 63 through the short axis of the liquid crystal molecules 81, the polarized light does not have phase difference. That is, the polarized condition of the light 83 is maintained until the polarized light meets to the upper polarizer 61. Therefore, after the incident light 83 is linearly polarized by the lower polarizer 63, it cannot pass the upper polarizer 61, so that the LCD represents the full black grayscale.

On the contrary, if a horizontal electric field is formed between the pixel electrode 79 and the common electrode 57 as shown in FIG. 4B, the liquid crystal molecules 81 will be rearranged to be parallel to the direction of the electric field by the dipole moment due to the horizontal electric field. In that case, the incident light 83 is also linearly polarized to 0° parallel to the X-axis by the lower polarizer 63, but the direction of the liquid crystal molecules 81 rearranged by the horizontal electric field is neither perpendicular nor parallel to the linearly polarized direction. As the linearly polarized light passes through the liquid crystal molecules 81, the linearly polarized light can be affected by the optical properties of the long axis and short axis. That is, the phases of the linearly polarized light will be changed. As a result, the light can pass the upper polarizer 61 and the LCD represents the full white gray-scale.

With these features, the liquid crystal molecules of the IPS mode TFT-LCD are driven on the In-plane condition, so that there is no phase different between the just front view direction of the LCD panel and the side view direction of the LCD panel. That is, the IPS mode TFT-LCD has wide view angle property, almost close to 180°. Furthermore, as the speed for driving the liquid crystal molecules is very fast, the IPS mode TFT-LCD is more acceptable to be applied to the TV monitor. However, in the most cases of the IPS mode TFT-LCD, the video data can be represented only when the power is on, and if the power is off, the display panel shows only black panel. Therefore, it is hard for the IPS mode TFT-LCD to be applied to the transparent display device or semi-transparent display device mostly used for the outdoor display device.

In order to meet the demand for various type display device, there have been many efforts for manufacturing the IPS mode TFT-LCD operating in normally white mode. One of typical example for that is shown in FIGS. 5A and 5B. FIGS. 5A and 5B briefly show the operating principle of the IPS mode TFT-LCD operating in normally white mode according to the related art.

Referring to FIG. 5A, the polarizing axis 3 of the lower polarizer 63 is set to 135°, the polarizing axis 1 of the upper polarizer 61 is set to 45°, and the initial alignment direction of the liquid crystal molecules 81 is set to 90° (or 0°). In this case, when there is no electric field for driving the liquid crystal molecules 81, the LCD can represent white gray-scale because the liquid crystal molecules 81 has 45° angle to both polarizing axes of the upper polarizer 61 and lower polarizer 63 (according to the same reason explained for FIG. 4B).

In addition, as shown in FIG. 5B, when the electric field is applied for driving the liquid crystal molecules 81, the liquid crystal molecules 81 are rearranged to be parallel to the direction of the electric field. Therefore, the incident light 83 is linearly polarized by the lower polarizer 63 and then it meets the liquid crystal molecules 81 which are either parallel or perpendicular to the direction of the linearly polarized light. As a result, the linearly polarized light does not have phase delay as it passes the liquid crystal molecules 81 and finally, the direction of the linearly polarized light will be maintained.

For example, when the liquid crystal molecules 81 are rearranged to 45° parallel to the polarizing axis 1 of the upper polarizer 61 due to the horizontal electric field applied between the pixel electrode 79 and the common electrode 57, the incident light 83 is linearly polarized by the lower polarizer 63 and the polarized light pass the liquid crystal molecules 81 maintaining the polarized condition because the directions of the linearly polarized light and the liquid crystal molecules 81 are perpendicular (or parallel). Finally the polarized light cannot pass the upper polarizer 61. As a result, LCD represents fully black gray-scale (according to the same reason explained for FIG. 4A).

With these features, the IPS mode TFT-LCD operating in normally white mode cannot represent the perfectly full white gray-scale, but yellowish white gray-scale. This yellowish phenomenon is determined by the the cell gap (i.e. thickness of the liquid crystal cell) and the refractive index difference of the liquid crystal material.

That is, the light transmittence of the liquid crystal cell is denoted as the Equation 1. Here, Γ is denoted as the Equation 2.

$$T = \frac{1}{2}\sin^2 2\alpha \times \sin^2\left(\frac{\Gamma}{2}\right) \quad \text{Equation 1}$$

$$\Gamma = 2\pi(n_e - n_o)\frac{d}{\lambda} = \frac{2\pi\Delta nd}{\lambda} \quad \text{Equation 2}$$

According to the Equations 1 and 2, the light transmittence is decided by the product of Δn and d. Here, Δn means the refractive index difference of the liquid crystal material, the difference between the refractive index in the long axis (ne) of the liquid crystal molecule and the refactive index in the short axis (no) of the liquid crystal molecule. FIG. 6 shows the difference between the refractive index in the long axis (ne) of the liquid crystal molecule and the refactive index in the short axis (no) of the liquid crystal molecule. As the liquid crystal molecule has long stick shape, Δn is always greater than 0. Therefore, according to the Equation 2, value of Γ should be greater than 0. Therefore, yellowish phenomenon is always occurred. Experimentally, in order that the light transmittance, T, meets white gray-scale without yellowish phenomenon, Δn should be 0.27~0.32 (μm). However, in real-situation, it is almost impossible to meet this condition even though the cell gap is controlled or any other types of the liquid crystal materials are used.

In the related art, a method has been suggested to solve the yellowish phenomenon, as shown in FIG. 7, in which a half wave plate 5 (or "HWP", or calles as 'half wave retaring plate') is inserted under the upper polarizer 61. For example, referring to FIG. 7, the polarizing axis 3 of the lower polarizer 63 is set to 0°, the polarizing axis 1 of the upper polarizer 61 is set to 90°, and the initial alignement direction of the liquid crystal molecules 81 is set to 90° (or 0°). Furthermore, the half wave plate 5 is disposed under the upper polarizer 61. In that case, when the electric field for driving the liquid crystal molecules 81 is not applied, the incident light 83 radiated to the TFT-LCD 50 is linearly polarized by the lower polarizer 63, the linearly polarized light does not have phase delays as it passes the liquid crystal molecules 81, and then the polarizing axis of the linearly polarized light is maintained not to pass the upper polarizer 61. However, by the half wave plate 5, the polarizing axis of the linearly polarized light is changed with half wave (λ/2) to pass the upper polarizer 61. Therefore, the IPS mode TFT-LCD can operate in normally white mode.

With these features, an additional optical film such as the half wave plate, it is required to increase the manufacturing process and cost.

SUMMARY OF THE INVENTION

The purpose of the present disclosure is to suggest a wide view angle IPS mode TFT-LCD operating in normally white mode. Another purpose of the present disclosure is to suggest a wide view angle IPS mode TFT-LCD operating in normally white mode to represent full white gray-scale without yellowish phenomenon. Still another purpose of the present disclosure is to provide a wide view angle IPS mode TFT-LCD operating in normally white mode having a simple structure without any additional optical sheet.

In order to accomplish these purposes, an wide view angle IPS mode TFT-LCD operating in normally white mode comprises a first polarizer having a first polarizing axis parallel to a first direction; a second polarizer having a second polarizing axis parallel to the first direction; and liquid crystal molecules disposed between the first polarizer and the second polarizer, and having an initial alignment direction parallel to the first direction.

The liquid crystal molecules of the wide view angle IPS mode TFT-LCD operating in normally white mode are driven in plane switching mode.

The wide view angle IPS mode TFT-LCD operating in normally white mode further comprises a first transparent substrate on the first polarizer; and a second transparent substrate under the second polarizer.

The first transparent substrate further comprises: a thin film transistor array; a pixel electrode electrically connected to the thin film transistor array; and a common electrode parallel to the pixel electrode; and the second transparent substrate further comprises a color filter array.

The LCD device according to the present disclosure is a wide view angle IPS mode TFT-LCD operating in normally white mode which represents full white gray-scale without yellowish phenomenon. Furthermore, as the LCD device according to the present disclosure does not need any additional optical film for overcoming the yellowish phenomenon, the manufacturing process is simply and cost is lower than the LCD according to the related art.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
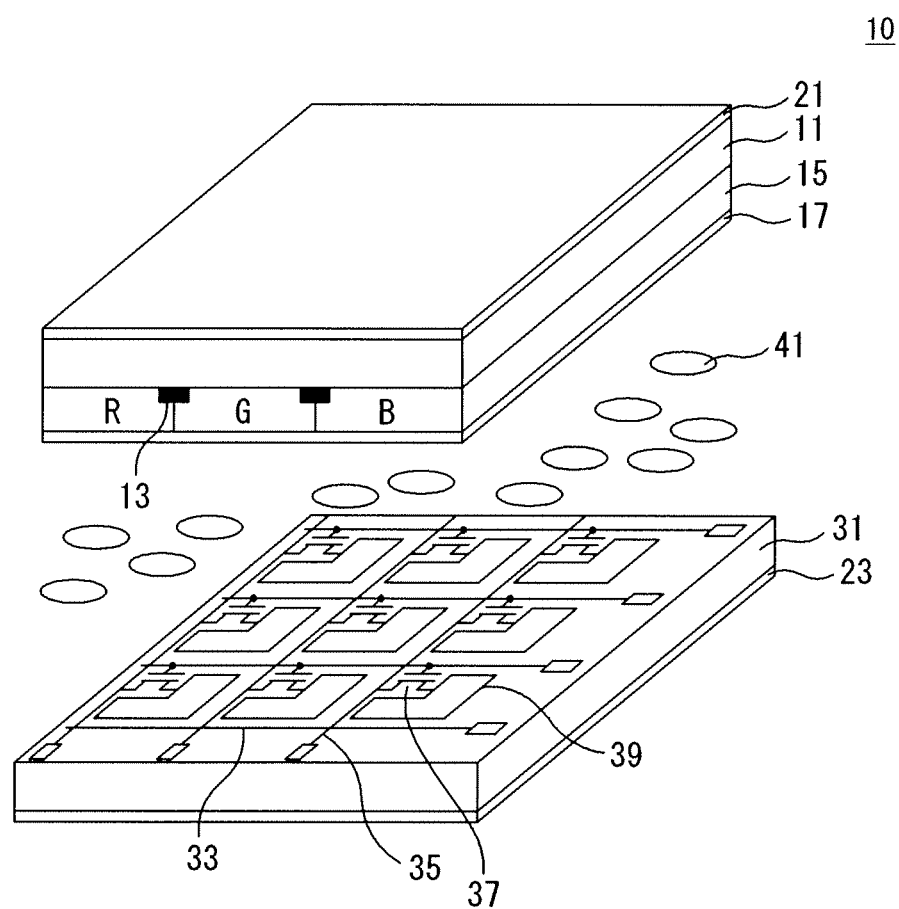
FIG. 1 is a perspective view illustrating the TN mode TFT-LCD operating in normally white mode according to the related art.
Figure 2A:
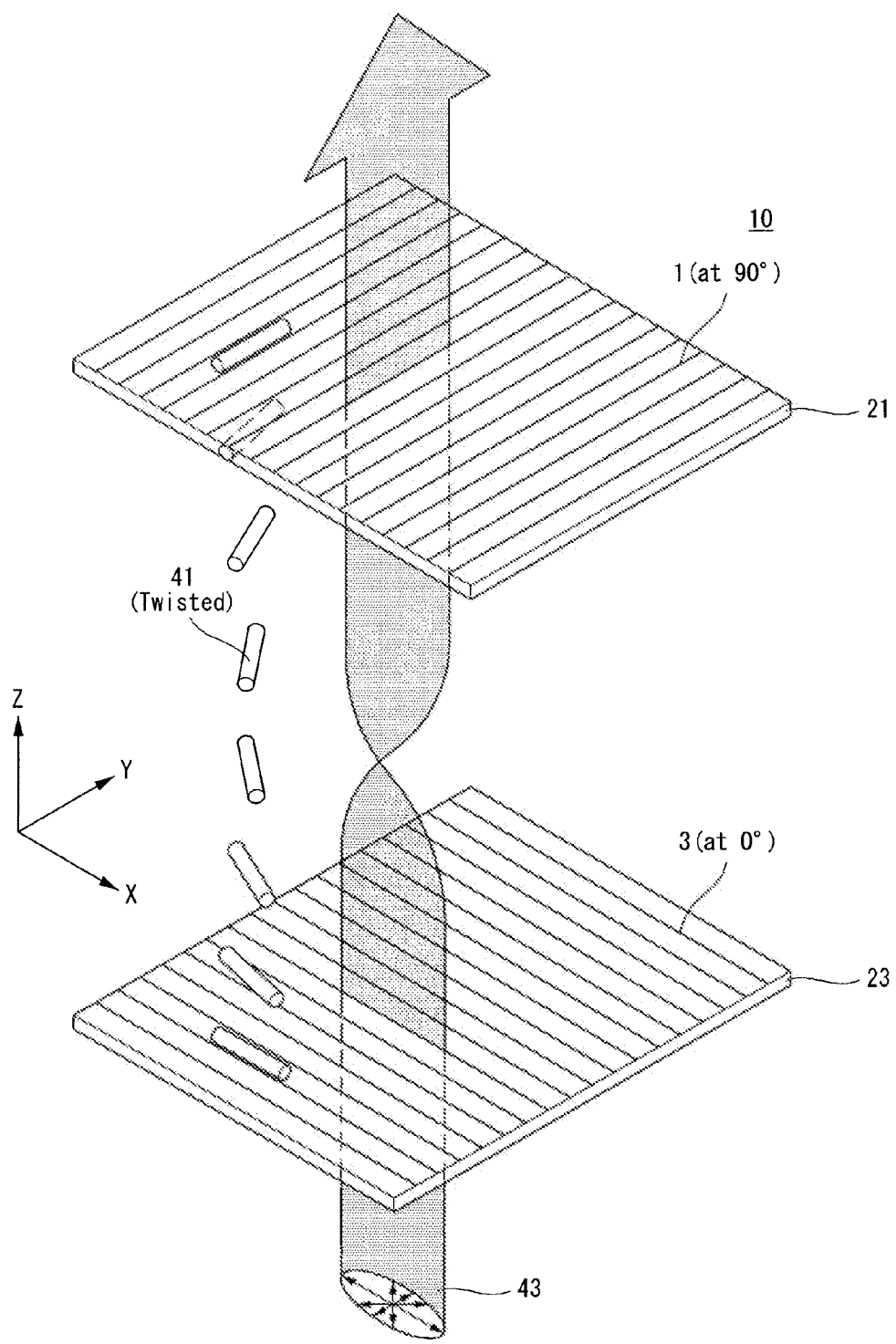
FIGS. 2A and 2B briefly show the operating principle of the TN mode TFT-LCD according to the FIG. 1.
Figure 2B:
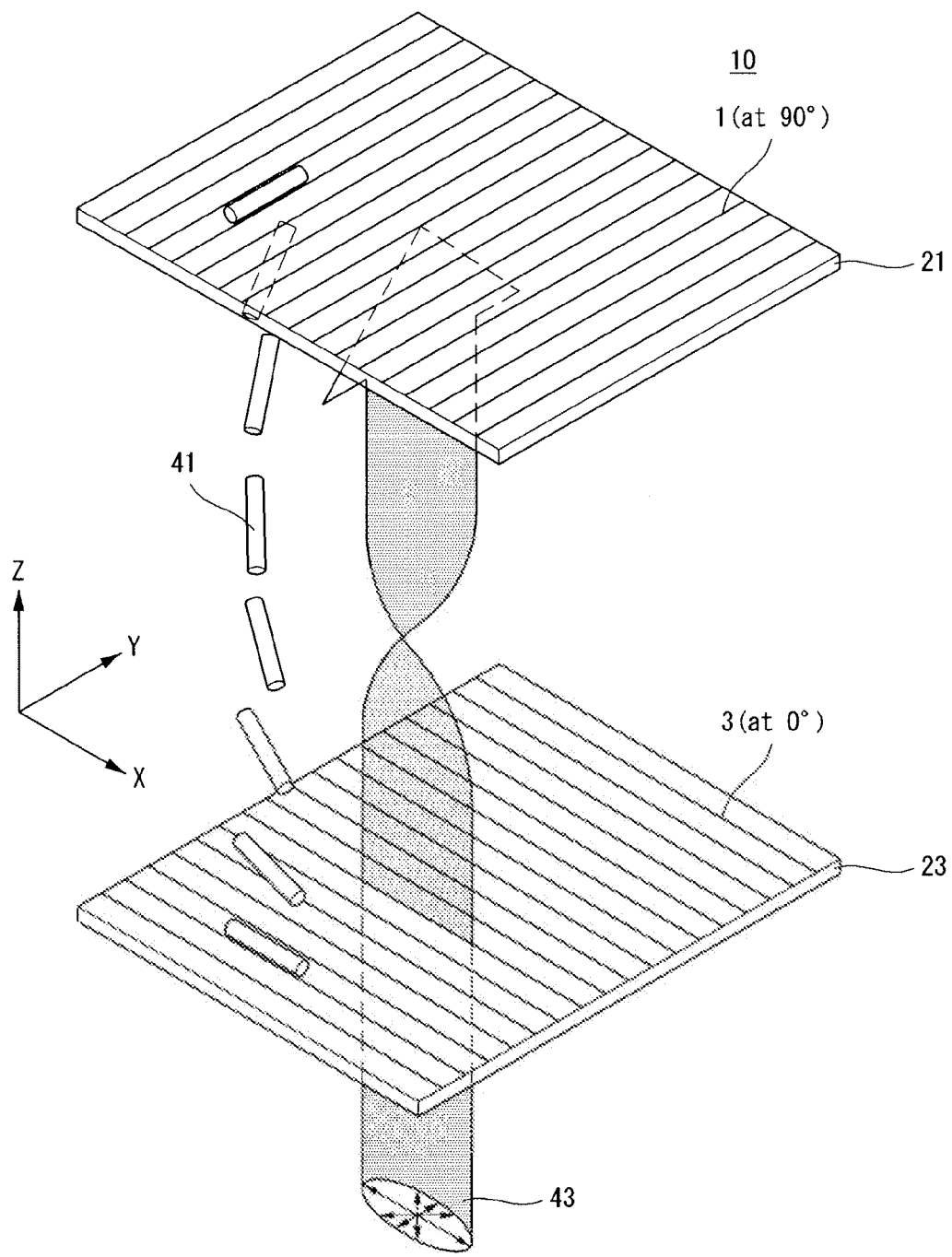
Figure 3:
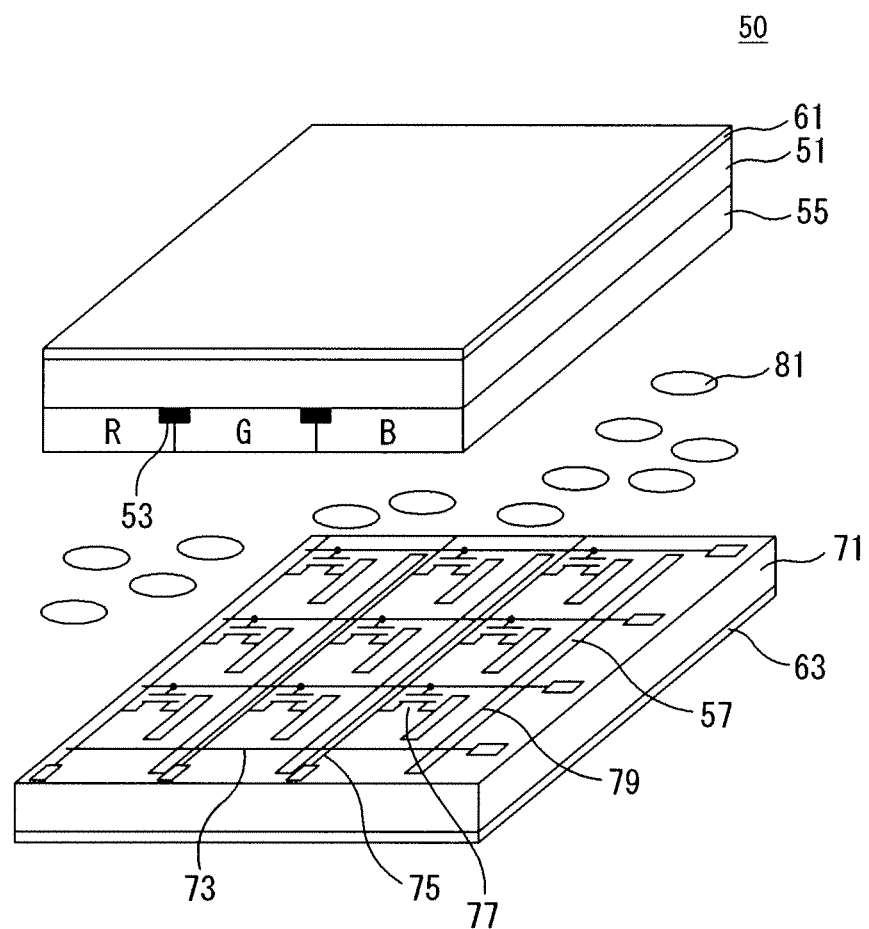
FIG. 3 is a perspective view illustrating the IPS mode TFT-LCD operating in normally black mode according to the related art.
Figure 4A:
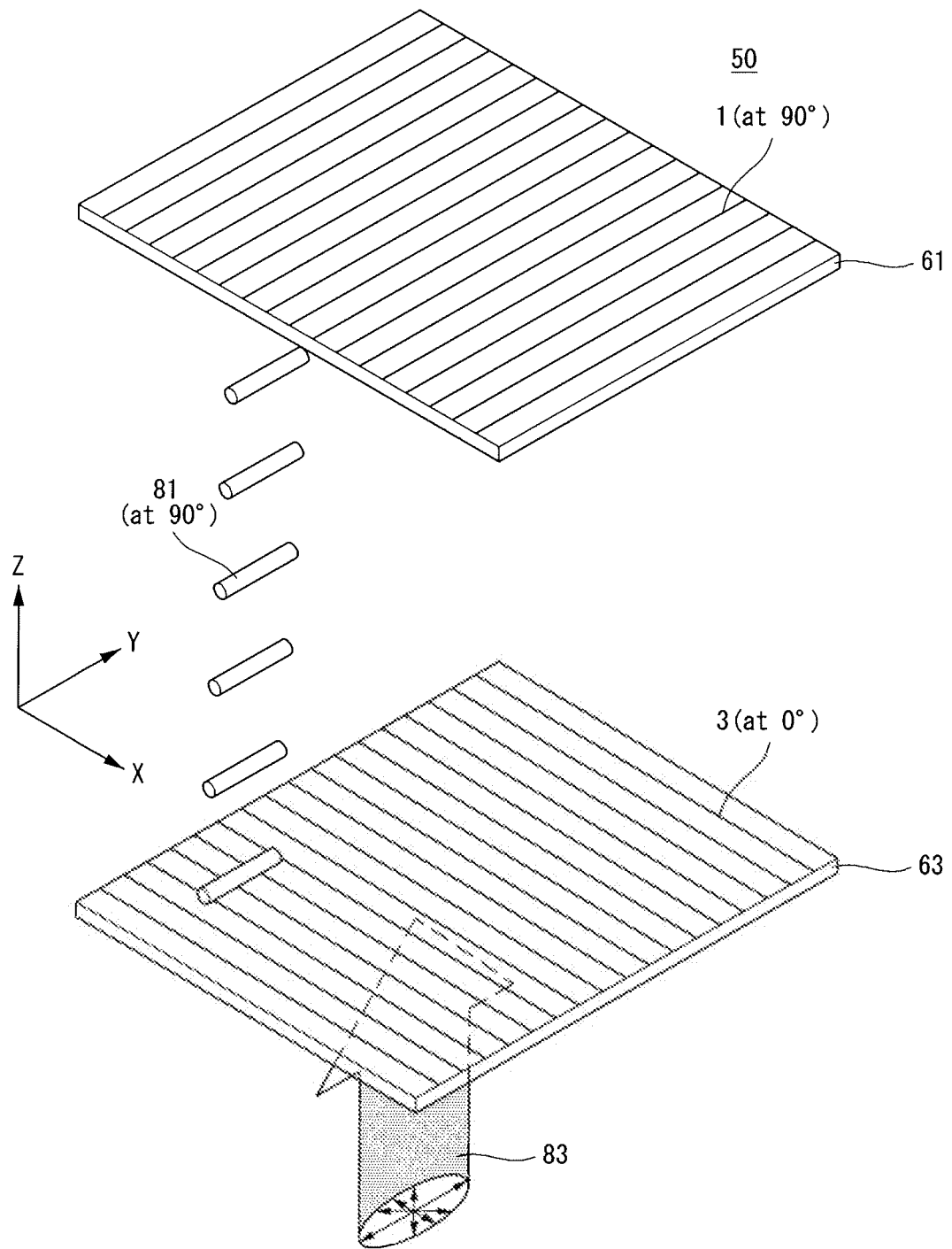
FIGS. 4A and 4B briefly show the operating principle of the IPS mode TFT-LCD according to the FIG. 3.
Figure 4B:
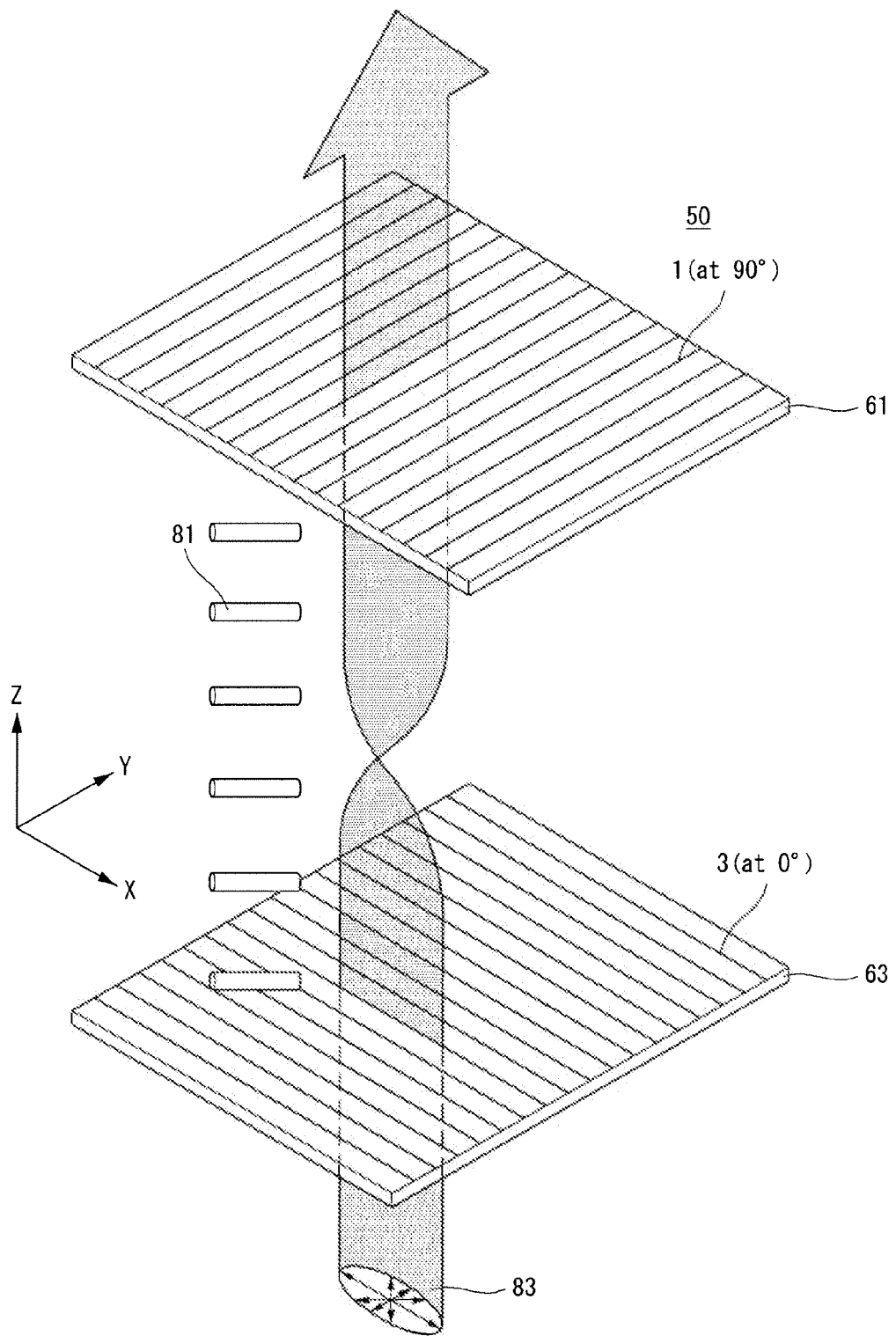
Figure 5A:
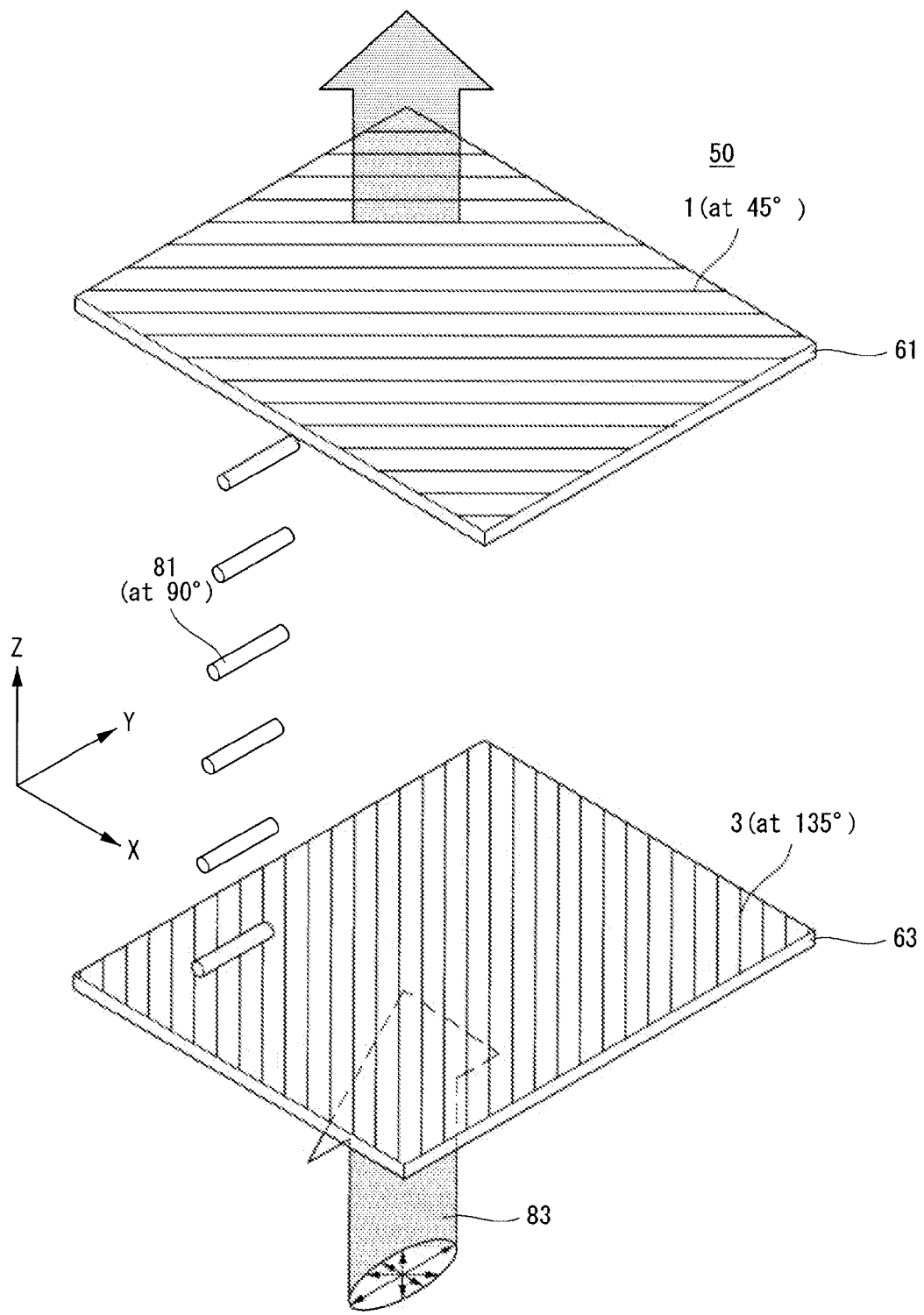
FIGS. 5A and 5B briefly show the operating principle of the IPS mode TFT-LCD operating in normally white mode according to the related art.
Figure 5B:
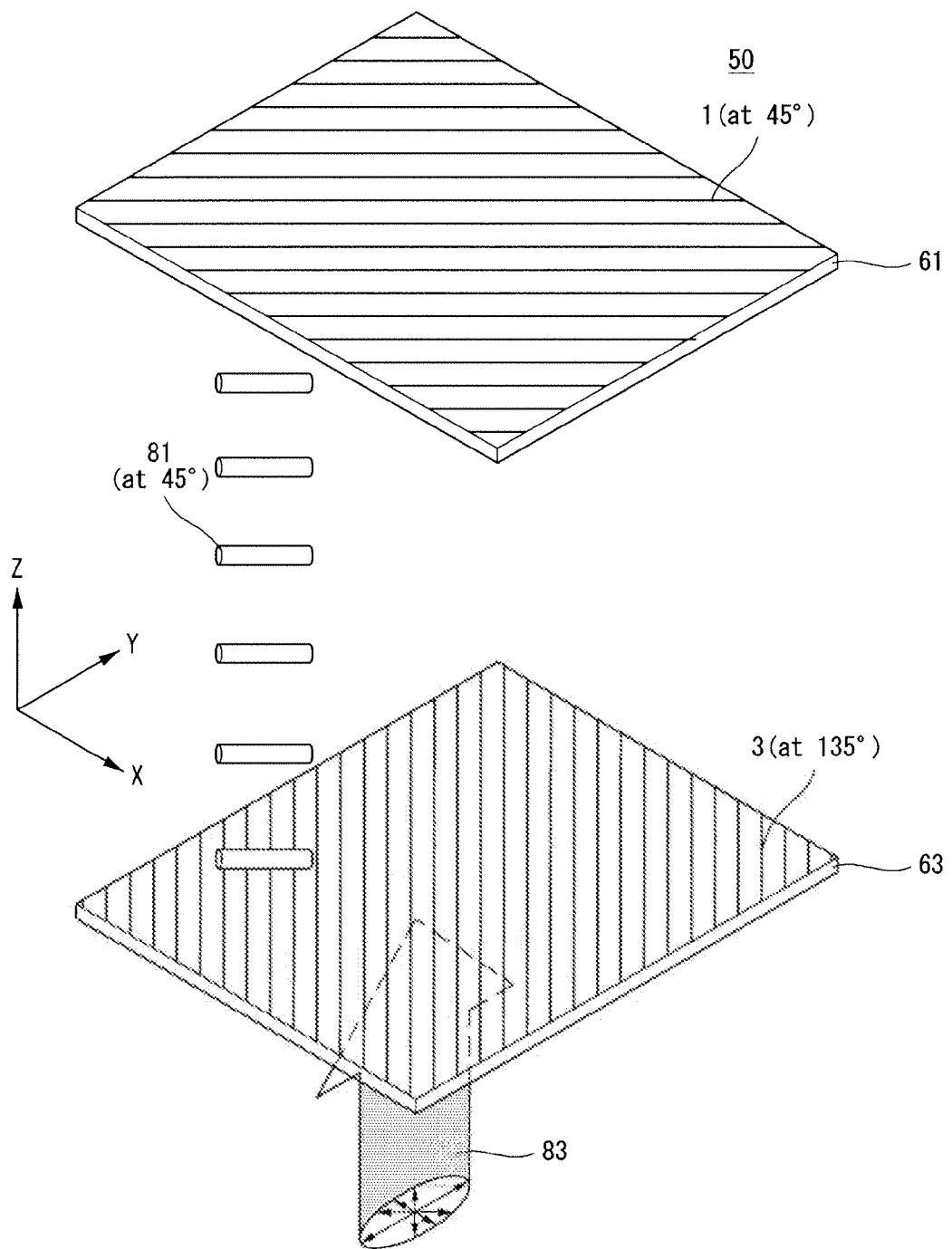
Figure 6:
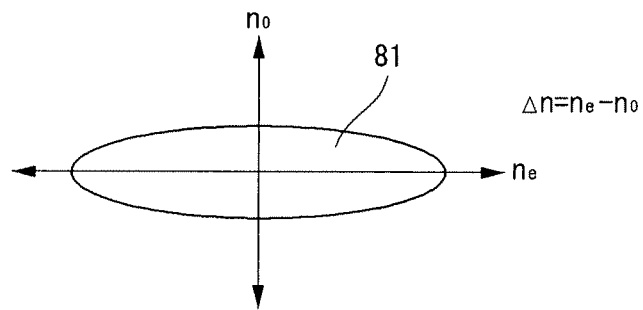
FIG. 6 shows the difference between the refractive index in the long axis (ne) of the liquid crystal molecule and the refactive index in the short axis (no) of the liquid crystal molecule.
Figure 7:
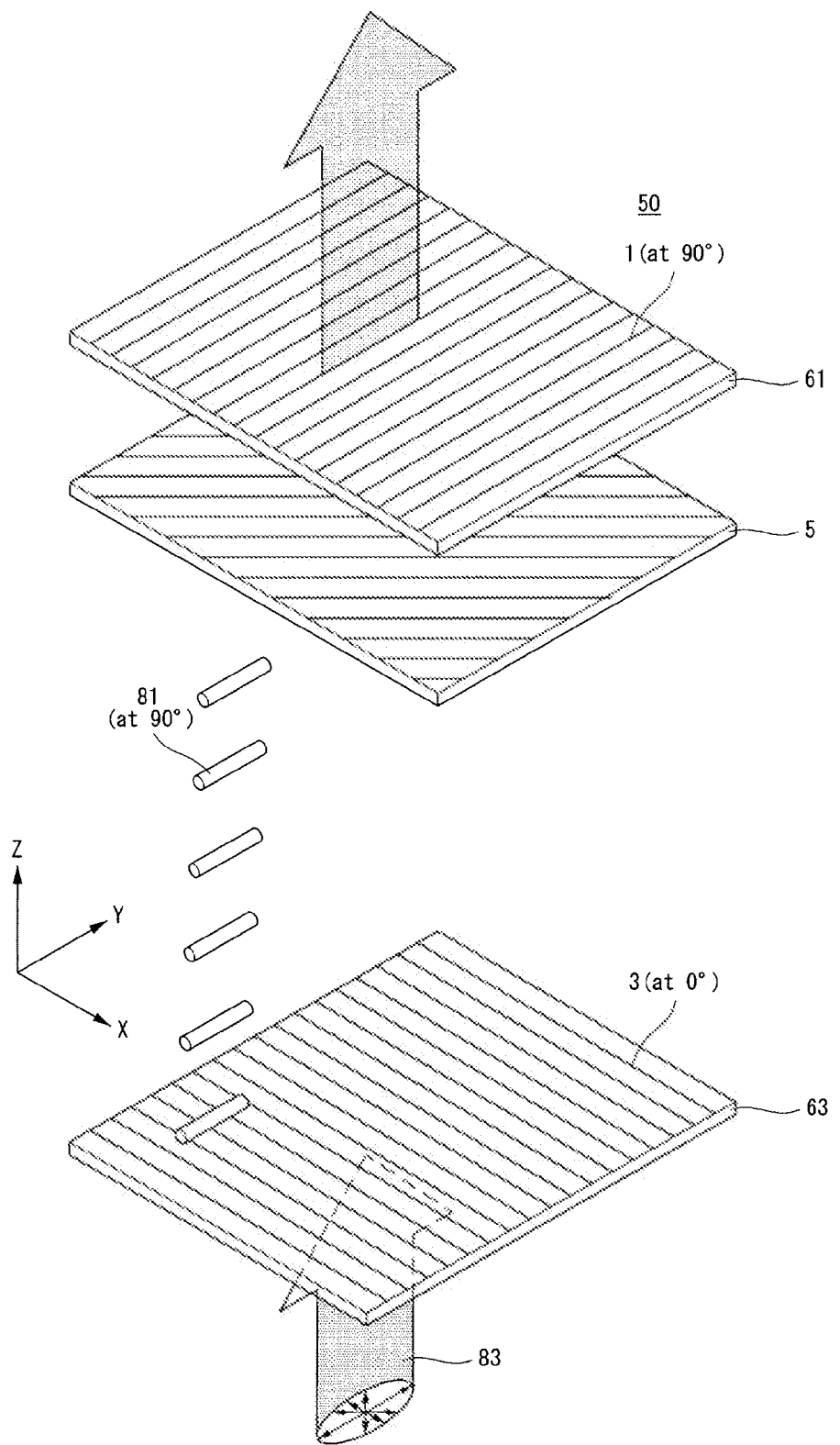
FIG. 7 is a perspective view illustrating the IPS mode TFT-LCD operating in normally white mode by adding a Half Wave Plate for reducing yellowish phenomenon according to the related art.
Figure 8:
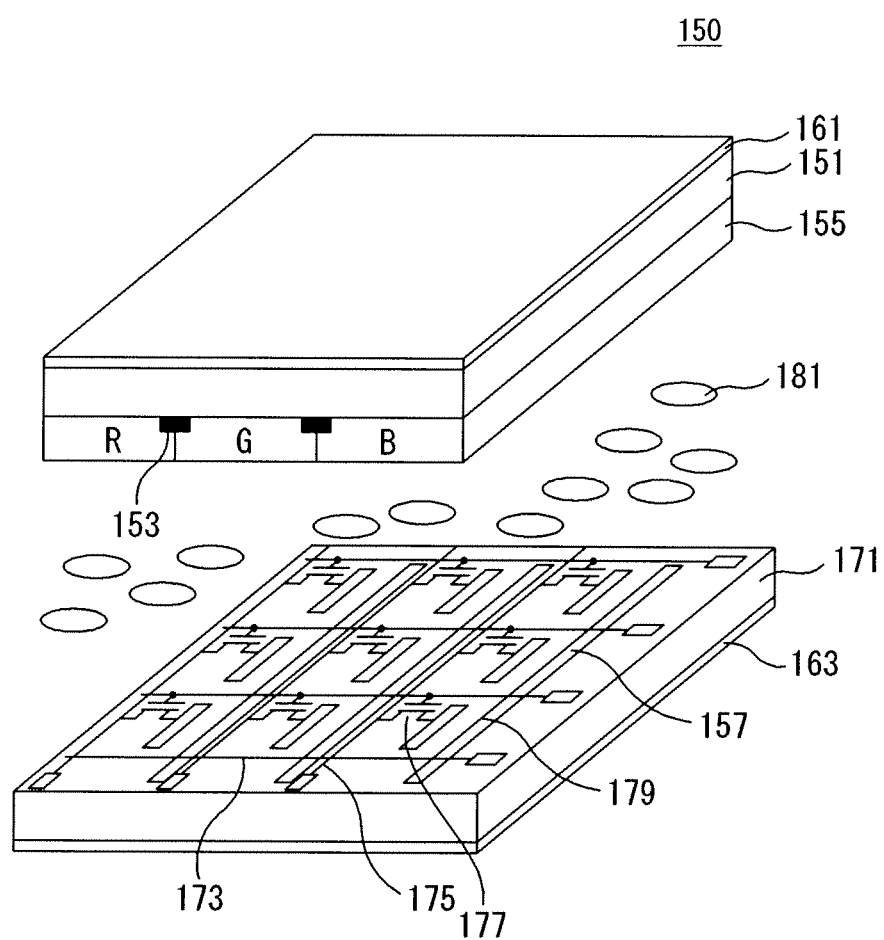
FIG. 8 is a perspective view illustrating an IPS mode TFT-LCD operating in normally white mode according to the present disclosure.
Figure 9A:
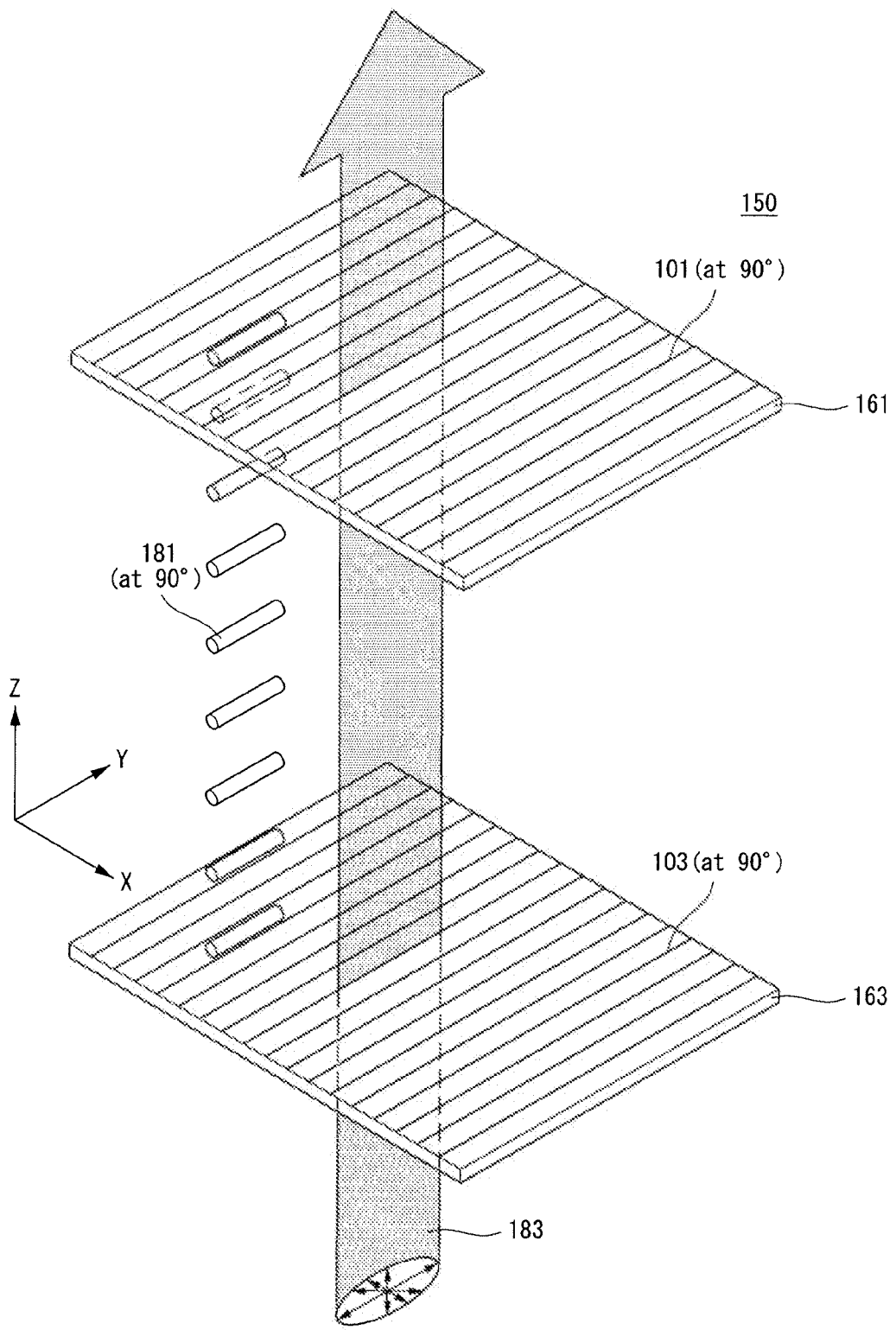
FIGS. 9A and 9B briefly show the operating principle of the IPS mode TFT-LCD operating in normally white mode according to the present disclosure.
Figure 9B:
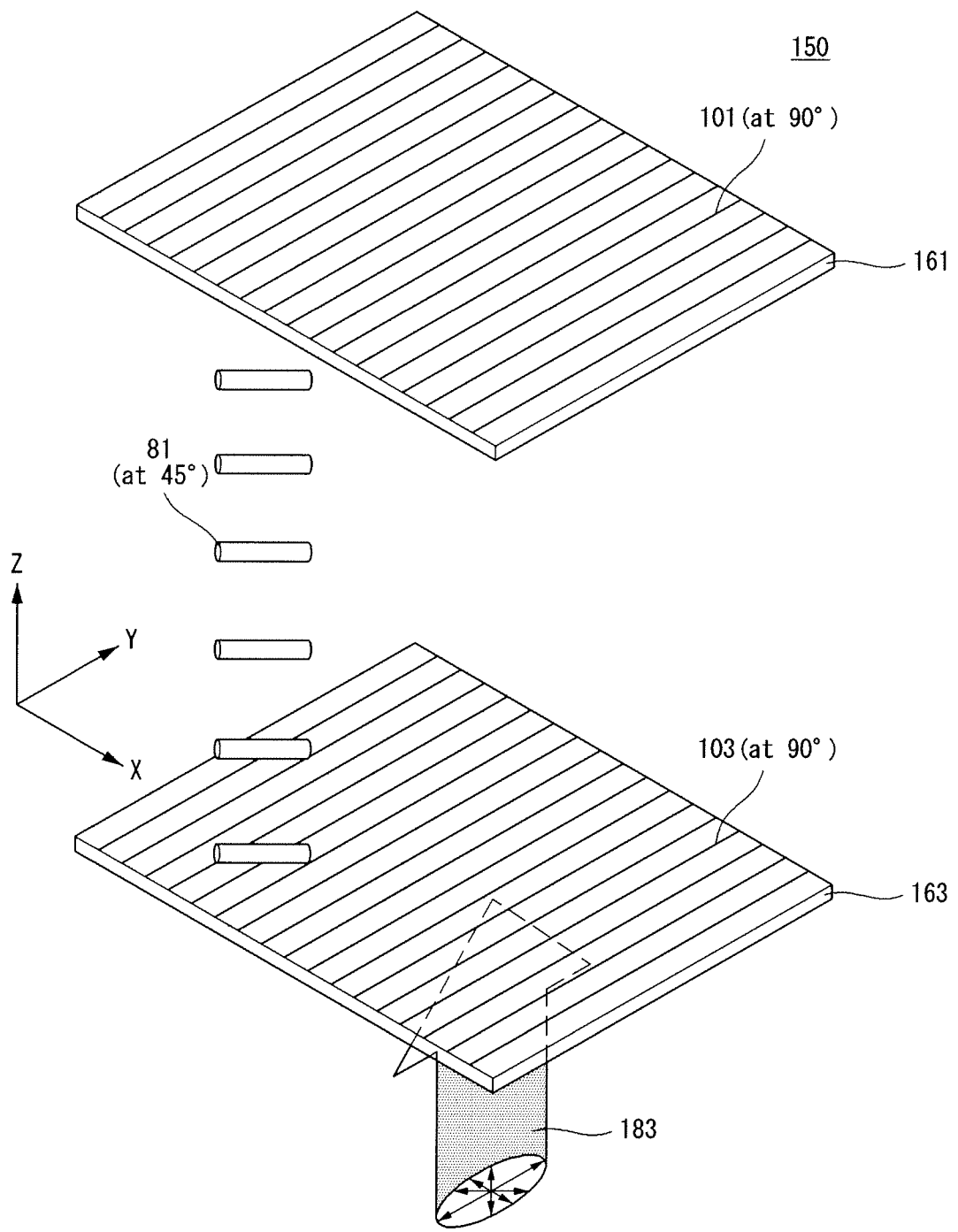

Referring to attached figures, the wide view angle IPS mode TFT-LCD operating in normally white mode according to the preferred embodiment of the present disclosure will be explained in detail. Advantages and features of the present disclosure will be apparent by referring to embodiments described below in detail in connection with the accompanying drawings, FIGS. 8 to 9A and 9B. FIG. 8 is a perspective view illustrating an IPS mode TFT-LCD operating in normally white mode according to the present disclosure. FIGS. 9A and 9B briefly show the operating principle of the IPS mode TFT-LCD operating in normally white mode according to the present disclosure. Like reference numerals designate like elements throughout the detailed description.

A wide view angle IPS mode TFT-LCD operating in normally white mode has a structure as shown in FIG. 8. The IPS mode TFT-LCD 150 comprises an upper substrate 151 and a lower substrate 171 which are disposed in facing each other, and liquid crystal cells including liquid crystal molecules 181 disposed between the substrates 151 and 171. On the lower substrate 171, a plurality of scan line 173 and a plurality of data line 175 are crossly disposed to define a plurality of pixel arrayed in matrix type. The TFT 177 is formed where the scan line 173 and the data line 175 is crossed. The TFT 177 is electrically connected to the pixel electrode 179 supplying a positive electric voltage to the liquid crystal molecules 181 of the liquid crystal cell. In order to form a horizontal electric field to the liquid crystal molecules 181, the IPS mode TFT-LCD 150 includes common electrode 157 formed on the lower substrate 171 with being parallel to the pixel electrode 179.

On the upper substrate 151, black matrix 153 is disposed in the matrix pattern at the position corresponding to the scan line 173 and the data line 175 of the lower substrate for defining the pixel. At the pixel, color filter 155 is formed in manner that the color filters 155 representing R(red) color, G(green) color and B(blue) color are sequentially arrayed.

Furthermore, an upper polarizer 161 and a lower polarizer 163 are disposed on the upper outside of the upper substrate 151 and the lower outside of the lower substrate 171, respectively. In order to operating the IPS mode TFT-LCD 15 in normally white mode, the upper polarizer 161 and the lower polarizer 163 should be disposed in manner that their polarizing axes are parallel each other. The liquid crystal molecules 181 disposed between the upper substrate 151 and the lower substrate 171 are arrayed with having an initial alignment direction parallel to the polarizing axes of the upper polarizer 161 and the lower polarizer 163.

For example, referring to the XYZ coordinate system shown in FIG. 9A, both the polarizing axis 101 of the upper polarizer 161 and the polarizing axis 103 of the lower polarizer 163 are set to 90° parallel to the Y-axis. Also, the initial alignment direction of the liquid crystal molecules 181 is set to 90° parallel to both the polarizing axis 101 of the upper polarizer 161 and the polarizing axis 103 of the lower polarizer 163. In this embodiment, even though the polarizing axes 101 and 103 and the initial alignment direction of liquid crystal molecules 181 are set to 90°, these may be set to 0°, 45°, 135° or other angle. In addition, even though the initial alignment direction of the liquid crystal molecules 181 is parallel to the polarizing axes 101 and 103, the initial alignment direction can be set to perpendicular to the polarizing axes 101 and 103.

Referring to FIGS. 9A and 9B, the operating conditions of the IPS mode TFT-LCD 150 according to the present disclosure is explained. In FIGS. 9A and 9B, the detailed explain is focused on the upper polarizer 161, the lower polarizer 163 and the liquid crystal molecules 181 mainly. For the elements not shown in the FIGS. 9A and 9B, see FIG. 8.

The IPS mode TFT-LCD 150 according to the present disclosure is operated in the normally white mode in which the white gray-scale is represented as the incident light through the lower polarizer 163 passes through the liquid crystal molecules 81 and the upper polarizer 61 when there is no electric field applied between the pixel electrode 179 and the common electrode 157, as shown in FIG. 9A. The incident light 183 from the light source (not shown) to the lower polarizer 163 is linearly polarized parallel to the polarizing axis 103 of the lower polarizer 163 as incident light 183 passes through the lower polarizer 163. As the liquid crystal molecules 181 and the polarizing axis 101 of the upper polarizer 161 are parallel to the polarizing axis 103 of the lower polarizer 163, the linearly polarized light can pass through the liquid crystal molecules 181 and the upper polarizer 161. The LCD implements the full white gray-scale. That is, the linearly polarized light by the lower polarizer 163 is affected by the optical property of the long axis of the liquid crystal molecules 181 because the polarized direction is parallel to the direction of the liquid crystal molecules 181. Therefore, the linearly polarized light maintains the polarization condition and then it can pass through the upper polarizer 161.

On the contrary, if a horizontal electric field is formed between the pixel electrode 179 and the common electrode 157 as shown in FIG. 9B, the liquid crystal molecules 181 will be rearranged to be parallel to the direction of the electric field by the dipole moment due to the horizontal electric field. In this case, the incident light 183 is also linearly polarized to 90° parallel to the Y-axis by the lower polarizer 163, but the direction of the liquid crystal molecules 181 rearranged by the horizontal electric field is not neither parallel nor perpendicular to the linearly polarized light direction. As the light passes through the liquid crystal molecules 181, the phases of the linearly polarized light will be changed. As a result, the polarizing direction will be changed.

For example, when there is a maximum horizontal electric field between the pixel electrode 179 and the commone electrode 157, the liquid crystal molecules 181 are rearranged from the initial alignment direction to 45°. Then, the linearly polarized light has the phase delay as it passes the liquid crystal molecules 181. As a result the LCD represents the full black gray-scale.

In the IPS mode TFT-LCD operating in normally white mode according to the present embodiment, when there is no electric field, the linearly polarized light after passing the lower polarizer 163 can pass through the liquid crystal molecules 181 and the upper polarizer 161 without changes on the polarizing direction. Therefore, the IPS mode TFT-LCD operating in normally white mode according to the present embodiment can represent full white gray-scale. That is, there is no deterioration on white gray-scale, such as yellowish phenomenon.

It is may be expected that it cannot represent full black gray-scale because the polarizing axis 101 upper polarizer 161 and the polarizing axis 103 of the lower polarizer 163 is not perpendicularly crossed. However, in actual situation, the problem by the none-full black gray-scale is much less serious than the yellowish phenomenon. Therefore, the IPS mode TFT-LCD according to the present disclosure can suggest good video quality enough to be better than any other LCD according to the related art.

The IPS mode TFT-LCD operating in normally white mode according to the present disclosure is mainly applied to the transparent display device, the reflective display device, or semi-transparent display device. In other words, it is for a wide view angle LCD device used in outdoor information display devices working under the sunlight. As the outdoor information display devices are used under the brighter situation than the brightness of the display device, the white gray-scale cannot be fully represented if the display device has the yellowish phenomenon. It causes the serious deterioration of the display quality. However, like the present application, even though the white gray-scale is fully represented but the black gray-scale is not fully represented, this none-full black problem is not so serious. Rather, it is more important for the outdoor display device to get greater difference between the white gray-scale and the black gray-scale which are represented by the display device.

For example, when the IPS mode TFT-LCD operating in normally white mode according to the present disclosure is applied to the transparent display device, there is no additional backlight source. That is, the light from the environment is used for the backlight source of this LCD device. Therefore, when it represents the white gray-scale, the white gray-scale has the highest brightness of the environment light (or it has the sunlight brightness when this display device is used for outdoor information device). When it represents the black gray-scale, the black gray-scale has the brightness as low as this LCD can do. This difference between the brightness of white gray-scale and the brightness of the black gray-scale can be higher than that of the IPS mode TFT-LCD operating in normally black mode according to the related art having the yellowish phenomenon. Therefore, the IPS mode TFT-LCD according to the present application ensures good quality of the display device.

In the present embodiment, the explanation is focused on the example of the transparent display device. However, the IPS mode TFT-LCD operating in normally white mode according to the present disclosure can provide the same effects and merits when it is applied to the reflective display device or the semi-transparent display device.

While the embodiment of the present invention has been described in detail with reference to the drawings, it will be understood by those skilled in the art that the invention can be implemented in other specific forms without changing the technical spirit or essential features of the invention. Therefore, it should be noted that the forgoing embodiments are merely illustrative in all aspects and are not to be construed as limiting the invention. The scope of the invention is defined by the appended claims rather than the detailed description of the invention. All changes or modifications or their equivalents made within the meanings and scope of the claims should be construed as falling within the scope of the invention.

What is claimed is:

1. A liquid crystal display device comprising:
a first polarizer having a first polarizing axis parallel to a first direction;
a second polarizer having a second polarizing axis parallel to the first direction; and
liquid crystal molecules disposed between the first polarizer and the second polarizer, and having an initial alignment direction parallel to the first direction,
wherein the liquid crystal molecules are disposed in a liquid crystal display panel and driven in an in-plane switching mode,
wherein the first polarizing axis, the second polarizing axis, and the initial alignment direction of the liquid crystal molecules disposed between the first polarizer and the second polarizer are parallel to each other to represent a white gray-scale when there is no electric field applied to the liquid crystal molecules in the liquid crystal display panel, and
wherein a polarized light by the first polarizer maintains a same polarization condition through the liquid crystal molecules to the second polarizer without being modified when there is no electric field applied in the liquid crystal display panel.

2. The device according to the claim 1, wherein the liquid crystal molecules are nematic phase liquid crystal material.

3. The device according to the claim 1, further comprising:
a first transparent substrate on the first polarizer; and
a second transparent substrate under the second polarizer.

4. The device according to the claim 3, wherein the first transparent substrate further comprises;
a thin film transistor array;
a pixel electrode electrically connected to the thin film transistor array; and
a common electrode parallel to the pixel electrode.

5. The device according to the claim 3, wherein the second transparent substrate further comprises a color filter array.

6. The device according to the claim 1, wherein the initial alignment direction of the liquid crystal molecules is the first direction.

7. The device according to the claim 1, wherein the initial alignment direction of the liquid crystal molecules is the second direction.

* * * * *